United States Patent
Ma et al.

(10) Patent No.: US 10,921,601 B2
(45) Date of Patent: Feb. 16, 2021

(54) OBJECT DISTANCE ADJUSTING APPARATUS AND VIRTUAL REALITY DEVICE

(71) Applicants: Beijing BOE Optoelectronics Technology Co., Ltd., Beijing (CN); BOE Technology Group Co., Ltd., Beijing (CN)

(72) Inventors: Zhanshan Ma, Beijing (CN); Wenhong Tian, Beijing (CN); Lili Chen, Beijing (CN); Hao Zhang, Beijing (CN); Dong Chen, Beijing (CN); Zhiyu Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 188 days.

(21) Appl. No.: 16/328,026

(22) PCT Filed: May 15, 2018

(86) PCT No.: PCT/CN2018/086854
§ 371 (c)(1),
(2) Date: Feb. 25, 2019

(87) PCT Pub. No.: WO2018/228116
PCT Pub. Date: Dec. 20, 2018

(65) Prior Publication Data
US 2019/0187480 A1   Jun. 20, 2019

(30) Foreign Application Priority Data
Jun. 13, 2017   (CN) .......................... 201710442061.7

(51) Int. Cl.
*G02B 27/14*   (2006.01)
*G02B 27/01*   (2006.01)

(52) U.S. Cl.
CPC ..... *G02B 27/0176* (2013.01); *G02B 27/0179* (2013.01); *G02B 2027/0154* (2013.01);
(Continued)

(58) Field of Classification Search
CPC .................................................. G02B 27/0176
(Continued)

(56) References Cited

U.S. PATENT DOCUMENTS

2018/0045911 A1   2/2018  Yang et al.
2018/0364490 A1*  12/2018 Lin ........................ G02B 27/02
2019/0187480 A1   6/2019  Ma et al.

FOREIGN PATENT DOCUMENTS

CN   102338523 A   2/2012
CN   104849862 A   8/2015
(Continued)

OTHER PUBLICATIONS

International Search Report (including English translation of Search Report) and Written Opinion (including English translation of Box V) for International Application No. PCT/CN2018/086854, dated Jul. 26, 2018, 15 pages.
(Continued)

*Primary Examiner* — James C. Jones
(74) *Attorney, Agent, or Firm* — Westman, Champlin & Koehler, P.A.

(57) ABSTRACT

An object distance adjusting apparatus includes a first adjustment mechanism, a second adjustment mechanism, and a third adjustment mechanism, the first adjustment mechanism being meshed with the second adjustment mechanism, and the second adjustment mechanism being meshed with the third adjustment mechanism. Rotation of
(Continued)

the first adjustment mechanism drives the second adjustment mechanism to rotate, and rotation of the second adjusting mechanism drives the third adjusting mechanism to rotate. A rotation axis of the third adjustment mechanism is perpendicular to both a rotation axis of the first adjustment mechanism and a rotation axis of the second adjustment mechanism. A virtual reality device including the object distance adjusting apparatus is also disclosed.

19 Claims, 4 Drawing Sheets

(52) U.S. Cl.
 CPC ............... *G02B 2027/0159* (2013.01); *G02B 2027/0185* (2013.01)

(58) Field of Classification Search
 USPC ........................................................ 359/630
 See application file for complete search history.

(56) References Cited

FOREIGN PATENT DOCUMENTS

| | | |
|---|---|---|
| CN | 104898279 A | 9/2015 |
| CN | 105204165 A | 12/2015 |
| CN | 105425398 A | 3/2016 |
| CN | 205067867 U | 3/2016 |
| CN | 107144964 A | 9/2017 |
| JP | 2010-66105 A | 3/2010 |
| JP | 2015-138137 A | 7/2015 |
| WO | 2016/172987 A1 | 11/2016 |

OTHER PUBLICATIONS

English translation of first Office Action for Chinese Patent Application No. 201710442061.7, dated Dec. 11, 2018, 10 pages.

* cited by examiner

OBJECT DISTANCE ADJUSTING APPARATUS AND VIRTUAL REALITY DEVICE

CROSS-REFERENCE TO RELATED APPLICATION

This application is a Section 371 National Stage Application of International Application No. PCT/CN2018/086854, filed on May 15, 2018, entitled "OBJECT DISTANCE ADJUSTING APPARATUS AND VIRTUAL REALITY DEVICE", which claims priority to Chinese Patent Application No. 201710442061.7 filed on Jun. 13, 2017 with CNIPA, incorporated herein by reference in entirety.

TECHNICAL FIELD

Embodiments of the present disclosure relate to the field of smart wear products, and in particular, to an object distance adjusting apparatus and a virtual reality device.

BACKGROUND

Virtual reality technology has gradually developed, and virtual reality head-mounted display devices are increasingly used by people. The mainstream head-mounted display devices are classified into two categories:

I. Object distance-nonadjustable type. That is, a distance between a lens and a display screen is fixed. Such kind of devices requires myopic users to wear myopia glasses to correct vision. Because of the need for myopia glasses, it is necessary for such kind of devices to reserve a thickness space for the myopia lenses on the basis of a normal space, which results in a large distance of exit pupil. In actual use, a part of the view angle is lost. In addition, bad feelings like perception of lens barrel, reflection of lens, and aggravation of dispersion also arise;

II. Object distance-adjustable type. That is, the position of a display screen may be adjusted to achieve object distance adjustment, so that it may be suitable for users with different degrees of myopia. The adjustment mechanism is mainly classified into two categories:

I) Rack and pinion type. That is, a pinion and a rack mesh with each other, and the rack may be driven to move linearly by rotation of the pinion, thereby driving the display screen to move back and forth. This adjustment mechanism has some disadvantages, for example, it lacks self-locking ability, the screen position is easy to move, or it needs to be adjusted repeatedly;

II) Bevel gear and screw thread type. That is, a screw rod may be rotated by one or more sets of bevel gears to drive a nut to move linearly, thereby driving the display to move back and forth. Although this adjustment mechanism has an effective self-locking structure, it lacks available standard component of bevel gears, which leads to high manufacturing costs. Moreover, the transmission ratio thereof is relatively small and the adjustment flexibility is poor.

SUMMARY

In a first aspect of the present disclosure, an embodiment of the present disclosure provides an object distance adjusting apparatus, comprising a first adjustment mechanism, a second adjustment mechanism, and a third adjustment mechanism, the first adjustment mechanism being meshed with the second adjustment mechanism, and the second adjustment mechanism being meshed with the third adjustment mechanism, wherein rotation of the first adjustment mechanism drives the second adjustment mechanism to rotate, and rotation of the second adjusting mechanism drives the third adjusting mechanism to rotate, wherein a rotation axis of the third adjustment mechanism is perpendicular to both a rotation axis of the first adjustment mechanism and a rotation axis of the second adjustment mechanism.

In some embodiments of the present disclosure, the first adjustment mechanism includes a first rotating shaft and first crown gears at both ends of the first rotating shaft, and the first crown gears are meshed with the second adjustment mechanism.

In some embodiments of the present disclosure, the first adjustment mechanism further comprises a first spur gear and a second crown gear, the first spur gear being coaxially disposed on the first rotating shaft, the second crown gear being meshed with the first spur gear, and rotation of the second crown gear drives the first spur gear to rotate, thereby driving the first rotating shaft and the first crown gear to rotate.

In some embodiments of the present disclosure, the first adjustment mechanism further comprises a knob, one side surface of the knob being fixedly connected to a planar side of the second crown gear, and the knob is configured to drive the second crown gear to rotate.

In some embodiments of the present disclosure, the second adjustment mechanism comprises a second rotating shaft and a second spur gear on the second rotating shaft, the second spur gear being coaxially disposed on the second rotating shaft, the second spur gear being meshed with both the first adjustment mechanism and the third adjustment mechanism, the first adjustment mechanism drives the second spur gear to rotate, and rotation of the second spur gear drives the second rotating shaft and the third adjustment mechanism to rotate.

In some embodiments of the present disclosure, the second adjustment mechanism further comprises a third spur gear on the second rotating shaft, the third spur gear being coaxially disposed on the second rotating shaft, the third spur gear being meshed with the third adjustment mechanism, and rotation of the second rotating shaft drives the third spur gear to rotate, thereby driving the third adjustment mechanism to rotate.

In some embodiments of the present disclosure, the third adjustment mechanism comprises a third crown gear and a screw rod, one end of the screw rod being fixedly connected to a planar side of the third crown gear, and the third crown gear is meshed with the second adjustment mechanism.

In some embodiments of the present disclosure, the object distance adjusting apparatus comprises two said second adjustment mechanisms and four said third adjustment mechanisms, and the third adjustment mechanisms are respectively meshed with ends of the second adjustment mechanism.

In some embodiments of the present disclosure, the first adjustment mechanism includes a first rotating shaft and first crown gears at both ends of the first rotating shaft, wherein the second adjustment mechanism comprises a second rotating shaft and a second spur gear on the second rotating shaft, the second spur gear being coaxially disposed on the second rotating shaft, wherein the first crown gear is meshed with the second spur gear.

In some embodiments of the present disclosure, the first adjustment mechanism includes a first rotating shaft and first crown gears at both ends of the first rotating shaft, wherein the second adjustment mechanism comprises a second rotating shaft and a second spur gear on the second rotating shaft, the second spur gear being coaxially disposed on the second rotating shaft, wherein the third adjustment mechanism comprises a third crown gear and a screw rod, one end of the screw rod being fixedly connected to a planar side of the third crown gear, wherein the first crown gear is meshed with the second spur gear, and the second spur gear is meshed with the third crown gear.

In some embodiments of the present disclosure, the first adjustment mechanism includes a first rotating shaft and first crown gears at both ends of the first rotating shaft, wherein the second adjustment mechanism comprises a second rotating shaft, a second spur gear on the second rotating shaft and a third spur gear on the second rotating shaft, the second spur gear and the third spur gear being coaxially disposed on the second rotating shaft, wherein the third adjustment mechanism comprises a third crown gear and a screw rod, one end of the screw rod being fixedly connected to a planar side of the third crown gear, and the object distance adjusting apparatus comprises a plurality of said third adjustment mechanisms, wherein the first crown gear is meshed with the second spur gear, the second spur gear is meshed with a third crown gear of one third adjustment mechanism, and the third spur gear is meshed with a third crown gear of another third adjustment mechanism.

In a second aspect of the present disclosure, an embodiment of the present disclosure also provides a virtual reality device comprising the object distance adjusting apparatus according to any one of the above embodiments.

In some embodiments of the present disclosure, the virtual reality device further comprises a display screen holder and a nut fixed to the display screen holder, wherein the display screen holder is configured to fix a display screen, and the nut is screwed to the third adjustment mechanism.

DETAILED DESCRIPTION OF EMBODIMENTS

In order to understand the objects, the technical solutions and the advantages of the present disclosure more clearly, the present disclosure will be further described in detail below with reference to the specific embodiments and the accompanying drawings.

Unless otherwise defined, technical terms or scientific terms used in the present disclosure are intended to be understood by those skilled in the art in the ordinary meaning thereof. The "first", "second", and similar terms used in the present disclosure do not denote any order, quantity, or importance, but are intended to distinguish different components. Similarly, the article of "a", "an", "the" and the similar terms also do not denote any limitation of quantity, and only denote at least one element in question. The word "comprising", "comprises" or the like means that the element or item preceding the word covers the elements or items and equivalents thereof listed behind the word, but rather excluding other elements or items. The word "connect" or "couple" and the like are not limited to physical or mechanical connections, but may include electrical connections, whether direct or indirect.

In view of this, an object of the present disclosure is to provide an object distance adjusting apparatus and a virtual reality device to improve high manufacturing costs and poor adjustment flexibility.

Figure 1:
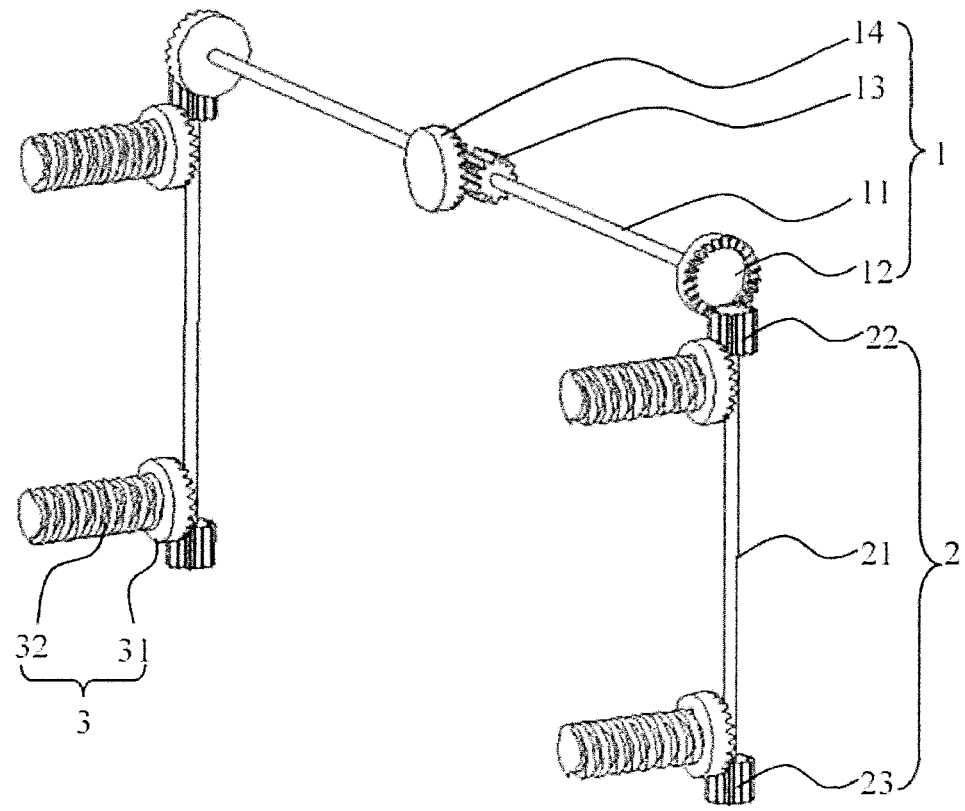
FIG. 1 is a perspective view of an object distance adjusting apparatus according to an embodiment of the present disclosure.
Figure 2:
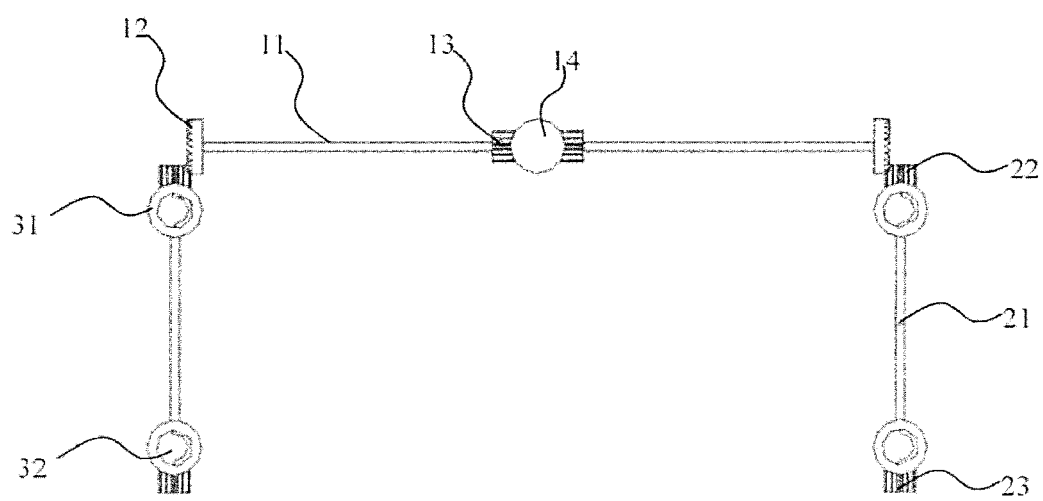
FIG. 2 is a front view of an object distance adjusting apparatus according to an embodiment of the present disclosure.

FIGS. 1 and 2 are respectively a perspective view and a front view of an object distance adjusting apparatus according to an embodiment of the present disclosure. As an embodiment of the present disclosure, the object distance adjusting apparatus includes a first adjustment mechanism 1, a second adjustment mechanism 2, and a third adjustment mechanism 3. The first adjustment mechanism 1 is meshed with the second adjustment mechanism 2, and the second adjustment mechanism 2 is meshed with the third adjustment mechanism 3. Rotation of the first adjustment mechanism 1 drives the second adjustment mechanism 2 to rotate, thereby driving the third adjustment mechanism 3 to rotate. It can be seen that, in the object distance adjusting apparatus according to the embodiment of the present disclosure, the second adjustment mechanism is driven to rotate by the first adjustment mechanism, and then the third adjustment mechanism is driven to rotate, so that an object (for example, a display screen holder) connected to the third adjustment mechanism is moved, thereby adjusting the object distance (for example, a distance between a display screen and a lens). The number of each of the first adjustment mechanisms 1, the second adjustment mechanisms 2, and the third adjustment mechanisms 3 is not limited, and the number of each of them may be single or plural. In the embodiment shown in FIGS. 1 and 2, the number of the first adjustment mechanisms 1 is one, the number of the second adjustment mechanisms 2 is two, and the number of the third adjustment mechanisms 3 is four.

As another embodiment of the present disclosure, the first adjustment mechanism 1 includes a first rotating shaft 11 and first crown gears 12 at both ends of the first rotating shaft 11, there are two first crown gears 12 shown in FIG. 1, and the first crown gears 12 mesh with the second adjustment mechanism 2. In the embodiment of the present disclosure, the second adjustment mechanism is driven to rotate by using a combination of the first crown gears and the first rotating shaft, and then the third adjustment mechanism is driven to rotate, so that the object connected to the third adjustment mechanism is moved, thereby adjusting the object distance. Since crown gear standard components are well-developed at present, there are a lot of choices in terms of part selection and transmission ratio design, thereby improving adjustment flexibility and reducing manufacturing costs. Moreover, since the first adjustment mechanism has no complicated structures and the combination of spur gear and crown gear has smaller volume than the combination of bevel gears, it can save space.

As still another embodiment of the present disclosure, the first adjustment mechanism 1 may further include a first spur gear 13 and a second crown gear 14, the first rotating shaft 11 passing through the first spur gear 13, and the second crown gear 14 meshes with the first spur gear 13. Therefore, the rotation of the second crown gear 14 can drive the first spur gear 13 to rotate, and then the first rotating shaft 11 and the first crown gears 12 are driven to rotate. Accordingly, the second adjustment mechanism and the third adjustment mechanism can be further driven to rotate to move the object connected to the third adjustment mechanism. Optionally, the first spur gear 13 is located at a central portion of the first rotating shaft 11 to stably drive the first rotating shaft and the first crown gears at both ends of the first rotating shaft to rotate simultaneously. In summary, the first adjustment mechanism 1 in the embodiment shown in FIG. 1 includes a first shaft 11, first crown gears 12, a first spur gear 13, and a second crown gear 14, wherein the number of the first crown gears 12 is two, two first crown gears 12 are respectively located at two ends of the first rotating shaft 11, the first spur gear 13 is located at a central portion of the first rotating shaft 11, revolution surfaces of the first crown gears 12 and the first spur gear 13 are perpendicular to the first rotating shaft 11, and the second crown gear 14 is meshed with the first spur gear 13.

Similarly, in the embodiment of the present disclosure, the first rotating shaft and the first crown gear are driven to rotate by using a combination of crown gear and spur gear, and then the second adjustment mechanism that meshes with the first crown gear is driven to rotate. Since crown gear standard components and spur gear standard components are well-developed at present, there are a lot of choices in terms of part selection and transmission ratio design, thereby improving adjustment flexibility and reducing manufacturing costs. Moreover, since the combination of spur gear and crown gear has smaller volume than the combination of bevel gears, it can further save space. In addition, by using the first spur gear and the second crown gear, it is convenient to drive the first rotating shaft to rotate, so that a user can conveniently drive the first adjustment mechanism to rotate by rotating the second crown gear.

Figure 3:
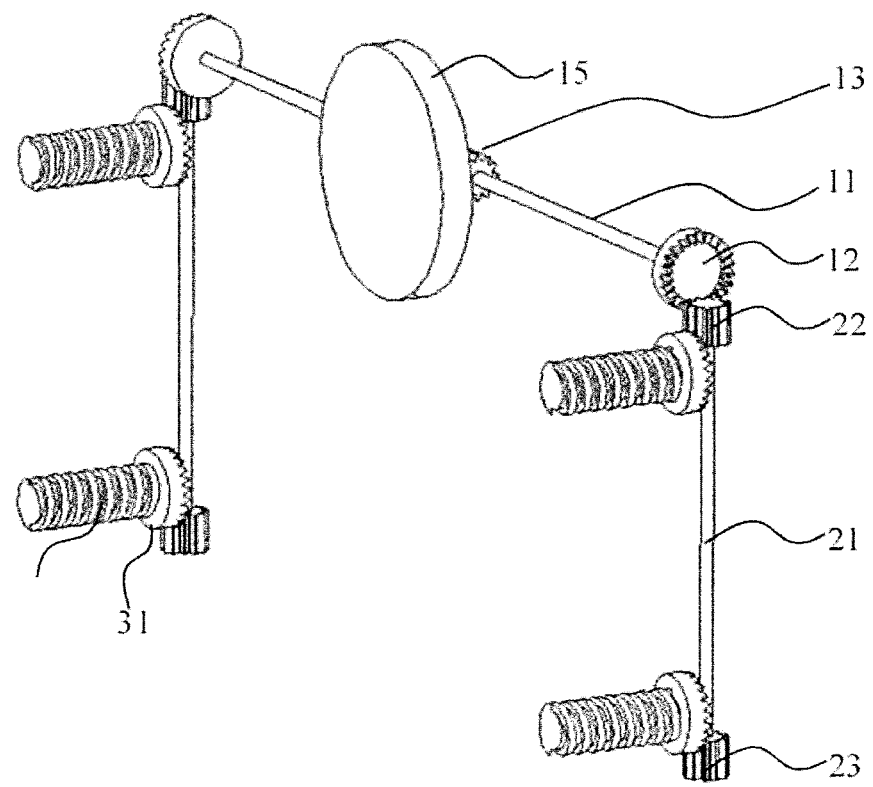
FIG. 3 is a perspective view of an object distance adjusting apparatus according to another embodiment of the present disclosure.
Figure 4:
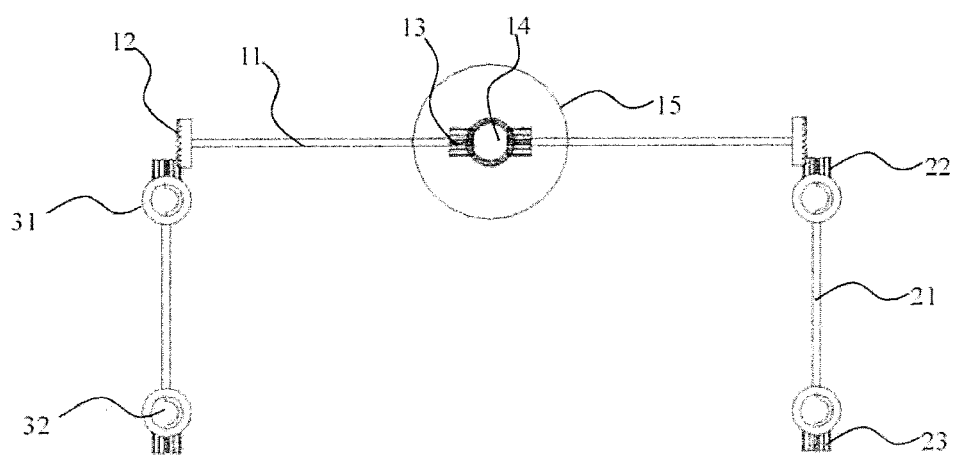
FIG. 4 is a front view of an object distance adjusting apparatus according to another embodiment of the present disclosure.

FIG. 3 and FIG. 4 are respectively a perspective view and a front view of an object distance adjusting apparatus according to another embodiment of the present disclosure. As another embodiment of the present disclosure, the first adjustment mechanism 1 may further include a knob 15, one side surface of the knob 15 is fixedly connected to a planar side of the second crown gear 14, and the knob 15 is configured for driving the second crown gear 14 to rotate, so that the user can rotate the second crown gear by rotating the knob, thereby improving convenience of rotation. The knob 15 may have a shape that is convenient for the user to hold, for example, a cylindrical shape, an ellipsoidal shape, or the like, or have any other irregular shape as long as it allows the user to hold and rotate it conveniently. Optionally, the knob 15 is cylindrical and has a diameter larger than that of the second crown gear 14 to facilitate the user to rotate the knob. Optionally, a center point of the knob 15 coincides with a center point of the second crown gear 14, and the center points of the knob 15 and the second crown gear 14 always coincide with each other when the knob 15 rotates. Thus, when the knob drives the second crown gear to rotate, it is ensured that the first adjustment mechanism can be stably rotated without offset.

In some embodiments of the present disclosure, as shown in FIGS. 1 and 2, the second adjustment mechanism 2 may include a second rotating shaft 21 and a second spur gear 22 on the second rotating shaft 21. The second spur gear is meshed with both the first adjustment mechanism and the third adjustment mechanism, the first adjustment mechanism drives the second spur gear to rotate, and the rotation of the second spur gear drives the second rotating shaft and the third adjustment mechanism to rotate. Optionally, a gear portion of the second spur gear 22 close to one end surface thereof meshes with the first adjustment mechanism 1, and another gear portion close to the other end surface meshes with the third adjustment mechanism 3, that is, a part of the second spur gear 22 meshes with the first adjustment mechanism 1, and the other part meshes with the third adjustment mechanism 3. Thus, when the first adjustment mechanism drives the second spur gear to rotate, the rotation of the second spur gear itself can drive the third adjustment mechanism to rotate. It can be seen that, in the embodiment of the present disclosure, the third adjustment mechanism is driven to rotate by using a combination of the second spur gear and the second rotating shaft, so that the object connected to the third adjustment mechanism moves, thereby adjusting the object distance. In some embodiments, the second spur gear 22 of the second adjustment mechanism 2 may mesh with the first crown gear 12 of the first adjustment mechanism 1 to engage the first adjustment mechanism 1 with the second adjustment mechanism 2.

As still another embodiment of the present disclosure, the second adjustment mechanism 2 may further include a third spur gear 23 on the second rotating shaft 21, and the third spur gear 23 meshes with the third adjustment mechanism 3, the rotation of the second spur gear 22 drives the second rotating shaft 21 to rotate, and the rotation of the second rotating shaft 21 drives the third spur gear 23 to rotate, thereby driving the third adjustment mechanism 3 to rotate. Optionally, the second spur gear 22 and the third spur gear 23 are respectively located at two ends of the second rotating shaft 21, and the second spur gear 22 and the third spur gear 23 are respectively meshed with the third adjustment mechanisms 3. Thus, the second adjustment mechanism can simultaneously drive a plurality of third adjustment mechanisms to rotate, so as to ensure a stable movement of the object connected to the third adjustment mechanism.

The revolution surfaces of the second spur gear 22 and the third spur gear 23 of the second adjustment mechanism 2 are both perpendicular to the second rotating shaft 21. Herein, the second spur gear 22 is simultaneously meshed with both the first crown gear 12 and the third adjustment mechanism 3 (specifically, a third crown gear 31, which will be described later), and the third spur gear 23 is meshed with only the third adjustment mechanism 3 (specifically a third crown gear 31, which will be described later). The first adjustment mechanism 1 and the second adjustment mechanism 2 are arranged in such a way that the first rotating shaft 11 and the second rotating shaft 21 are perpendicular to each other.

As still another embodiment of the present disclosure, the third adjustment mechanism 3 may include a third crown gear 31 and a screw rod 32, one end of the screw rod 32 being fixedly connected to a planar side of the third crown gear 31, and the third crown gear 31 meshes with the second adjustment mechanism 2. In the embodiment of the present disclosure, by means of using a combination of crown gear and screw rod, the rotation of the screw rod causes the object connected to the third adjustment mechanism to move, thereby adjusting the object distance. Since crown gear standard components are well-developed at present, there are a lot of choices in terms of part selection and transmission ratio design, thereby improving adjustment flexibility and reducing manufacturing costs. Moreover, since the third adjustment mechanism has smaller volume, it can further save space. In some embodiments, the second spur gear 22 of the second adjustment mechanism 2 may mesh with the third crown gear 31 of the third adjustment mechanism 3 to engage the second adjustment mechanism 2 with the third adjustment mechanism 3. In some embodiments, the third spur gear 23 of the second adjustment mechanism 2 may also mesh with the third crown gear 31 of the third adjustment mechanism 3 to engage the second adjustment mechanism 2 with the third adjustment mechanism 3. Optionally, the number of the third adjustment mechanisms 3 may be plural, and these third adjustment mechanisms 3 may be symmetrically distributed, so that the third adjustment mechanisms can be symmetrically connected to the object to be adjusted.

In some embodiments of the present disclosure, the number of the second adjustment mechanisms 2 is two, the number of the third adjustment mechanisms 3 is four, and the third adjustment mechanisms 3 are respectively meshed with ends of the second adjustment mechanisms 2. That is, the second spur gear 22 and the third spur gear 23 are respectively fixed to two ends of the second rotating shaft 21, and the second spur gear 22 and the third spur gear 23 are respectively meshed with the third crown gears 31 of the third adjustment mechanisms 3. The four third adjustment mechanisms can ensure a stable overall translation of the object connected to the third adjustment mechanisms.

It should be noted that the number of the third adjustment mechanisms 3 may be six. In this case, it is necessary to provide two third spur gears 23 on each of the second rotating shafts 21, and each of the second rotating shafts 21 simultaneously drives the two third spur gears 23 to rotate, so as to drive the third adjustment mechanisms 3 engaged with the third spur gears 23 to rotate. In this case, the second spur gear 22 may be located at one side of the second rotating shaft 21, one third spur gear 23 is located at the other side of the second rotating shaft 21, and the other third spur gear 23 is located at a central portion of the second rotating shaft 21. Alternatively, the number of the third adjustment mechanisms 3 may be eight, ten, and so on.

The first adjustment mechanism 1, the second adjustment mechanism 2, and the third adjustment mechanism 3 are disposed in such a way that the first rotating shaft 11 and the second rotating shaft 21 are perpendicular to each other, and an axis of the screw rod 32 is perpendicular to the first rotating shaft 11 and the second rotating shaft 21. That is, a rotation axis of the third adjustment mechanism is perpendicular to a rotation axis of the first adjustment mechanism and a rotation axis of the second adjustment mechanism.

In an embodiment of the present disclosure, it further provides a virtual reality device, including the object distance adjusting apparatus according to any one of the above embodiments. The second adjustment mechanism can be driven to rotate by the first adjustment mechanism, and then the third adjustment mechanism is driven to rotate, so that the object connected to the third adjustment mechanism is moved, thereby adjusting the object distance.

Figure 5:
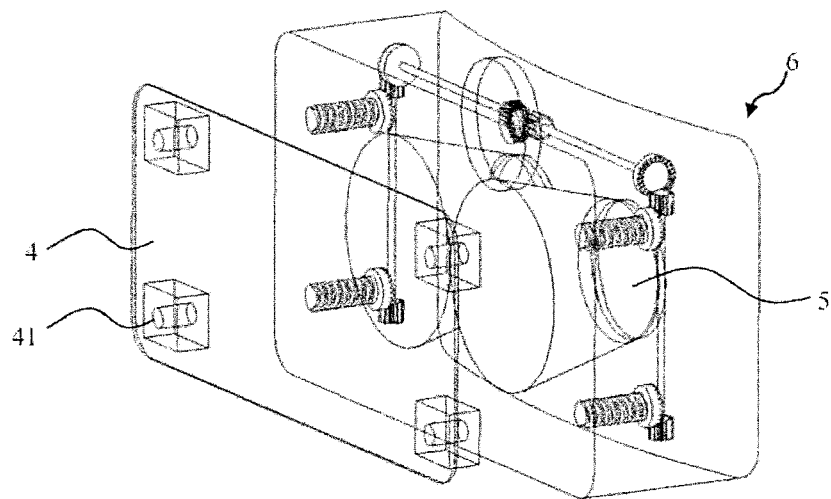
FIG. 5 is an exploded view of a virtual reality device according to an embodiment of the present disclosure.
Figure 6:
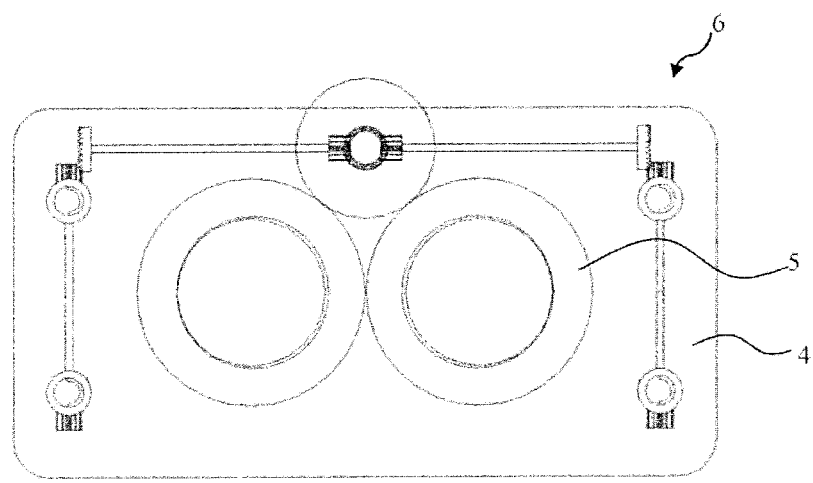
FIG. 6 is a front view of a virtual reality device according to an embodiment of the present disclosure.

As an embodiment of the present disclosure, as shown in FIGS. 5 and 6, the virtual reality device 6 further includes a display screen holder 4 and a nut 41 fixed to the display screen holder. The display screen holder 4 is configured for fixing a display screen, and the nut 41 is screwed to the third adjustment mechanism 3. In this embodiment, a screw connection between the display screen 4 and the third adjustment mechanism 3 can be realized by the display screen holder and the nut, and it can also have a function of moving the display screen. Moreover, since the lead angle of the screw can achieve a self-locking effect, the display screen can be prevented from being moved by an external force. In some embodiments, the screw rod 32 in the third adjustment mechanism 3 may be screwed to the nut 41, so that the display screen holder (the object to be adjusted) is screwed to the third adjustment mechanism. Optionally, there are four nuts 41 provided at four corners of the display screen holder 4 respectively, the four nuts 41 are symmetrically distributed on the display screen holder 4 and respectively screwed to the third adjustment mechanisms 3.

Figure 7:
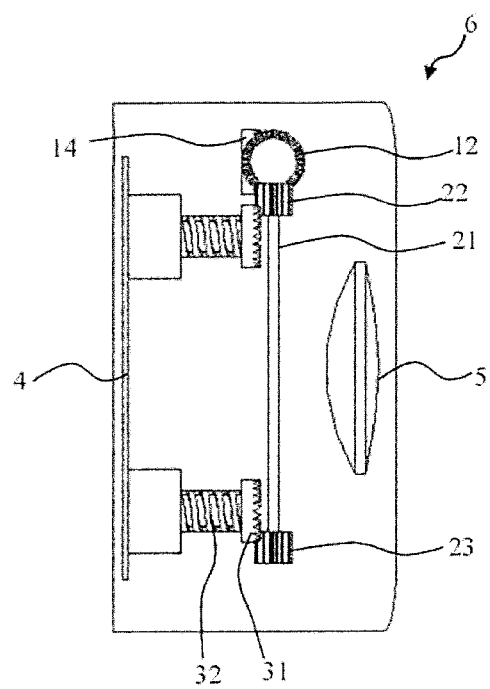
FIG. 7 is a schematic structural view of a virtual reality device according to an embodiment of the present disclosure, in which a display screen holder has not been moved.
Figure 8:
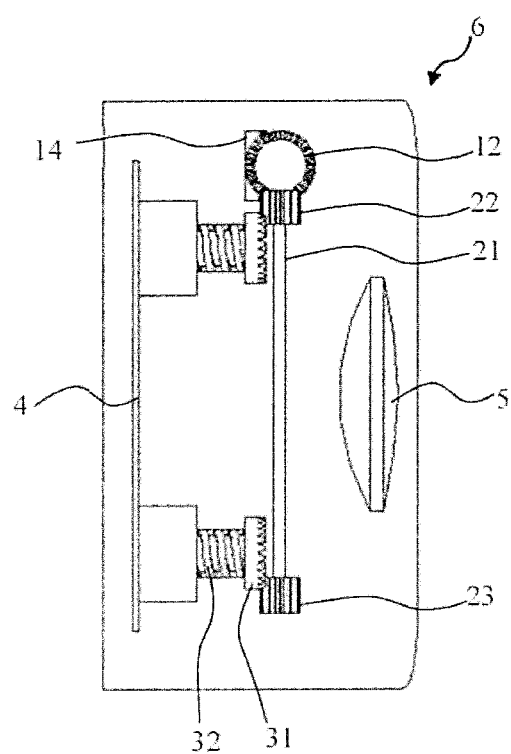
FIG. 8 is a schematic structural view of a virtual reality device according to an embodiment of the present disclosure, in which a display screen holder has been moved.

As shown in FIGS. 7 and 8, the rotation of the first rotating shaft 11 drives the first crown gears 12 at two ends of the first rotating shaft 11 to rotate, the rotation of the first crown gears 12 drives the second spur gears 22 to rotate, the rotation of the second spur gears 22 drives the upper third crown gears 31 to rotate. Meanwhile, the rotation of the second spur gears 22 drives the second rotating shafts 21 to rotate, the rotation of the second rotating shafts 21 drives the third spur gears 23 on the second rotating shafts 21 to rotate, and the rotation of the third spur gears 23 drives the lower third crown gears 31 to rotate. Further, the rotation of the third crown gears 31 drives the screw rods 32 to rotate, the rotation of the screw rods 32 changes screwing depths between the screw rods 32 and the nuts 41, and the display screen holder 4 moves accordingly, thereby changing the distance between the display screen and the lens 5. Therefore, the distance between the display screen and the lens can be adjusted through the screw connection between the display screen holder and the third adjustment mechanism, so that the diopter may be adjusted to adapt to users of different degrees of myopia. In this way, it is not necessary for the users to wear myopia glasses during the use of the product.

It can be seen that, in the object distance adjusting apparatus and the virtual reality device according to the embodiments of the present disclosure, the second adjustment mechanism is driven to rotate by the first adjustment mechanism, and then the third adjustment mechanism is driven to rotate, so that an object (for example, a display screen holder) connected to the third adjustment mechanism is moved, thereby adjusting the object distance (for example, a distance between a display screen and a lens). Since crown gear standard components and spur gear standard components are well-developed at present, there are a lot of choices in terms of part selection and transmission ratio design, thereby improving adjustment flexibility and reducing manufacturing costs. Moreover, since the first adjustment mechanism has no complicated structures and the combination of spur gear and crown gear has smaller volume than the combination of bevel gears, it can save space.

It should be understood by those skilled in the art that any of the above embodiments is merely exemplary and is not intended to imply that the scope of the present disclosure (including the claims) is limited to these examples. Under the spirit of the present disclosure, the technical features in the above embodiments or different embodiments may be combined, and there are many other variations of the various aspects of the present disclosure as described above, which are not provided in detail for the sake of brevity. Therefore, any omissions, modifications, equivalent substitutions, improvements and the like, which are made within the spirit and scope of the present disclosure are all included within the scope of the present disclosure.

What is claimed is:

1. An object distance adjusting apparatus, comprising a first adjustment mechanism, a second adjustment mechanism, and a third adjustment mechanism, the first adjustment mechanism being meshed with the second adjustment mechanism, and the second adjustment mechanism being meshed with the third adjustment mechanism,
wherein rotation of the first adjustment mechanism drives the second adjustment mechanism to rotate, and rotation of the second adjusting mechanism drives the third adjusting mechanism to rotate,
wherein a rotation axis of the third adjustment mechanism is perpendicular to both a rotation axis of the first adjustment mechanism and a rotation axis of the second adjustment mechanism.

2. The object distance adjusting apparatus according to claim 1, wherein the first adjustment mechanism includes a first rotating shaft and first crown gears at both ends of the first rotating shaft, and the first crown gears are meshed with the second adjustment mechanism.

3. The object distance adjusting apparatus according to claim 2, wherein the first adjustment mechanism further comprises a first spur gear and a second crown gear, the first spur gear being coaxially disposed on the first rotating shaft, the second crown gear being meshed with the first spur gear, and rotation of the second crown gear drives the first spur gear to rotate, thereby driving the first rotating shaft and the first crown gear to rotate.

4. The object distance adjusting apparatus according to claim 3, wherein the first adjustment mechanism further comprises a knob, one side surface of the knob being fixedly connected to a planar side of the second crown gear, and the knob is configured to drive the second crown gear to rotate.

5. The object distance adjusting apparatus according to claim 1, wherein the second adjustment mechanism comprises a second rotating shaft and a second spur gear on the second rotating shaft, the second spur gear being coaxially disposed on the second rotating, shaft, the second spur gear being meshed with both the first adjustment mechanism and the third adjustment mechanism, the first adjustment mechanism drives the second spur gear to rotate, and rotation of the second spur gear drives the second rotating shaft and the third adjustment mechanism to rotate.

6. The object distance adjusting apparatus according to claim 5, wherein the second adjustment mechanism further comprises a third spur gear on the second rotating shaft, the third spur gear being coaxially disposed on the second rotating shaft, the third spur gear being meshed with the third adjustment mechanism, and rotation of the second rotating shaft drives the third spur gear to rotate, thereby driving the third adjustment mechanism to rotate.

7. The object distance adjusting apparatus according to claim 6, wherein the third adjustment mechanism comprises a third crown gear and a screw rod, one end of the screw rod being fixedly connected to a planar side of the third crown gear, and the third crown gear is meshed with the second adjustment mechanism.

8. The object distance adjusting apparatus according to claim 1, wherein the object distance adjusting apparatus comprises two said second adjustment mechanisms and four said third adjustment mechanisms, and the third adjustment mechanisms are respectively meshed with ends of the second adjustment mechanism.

9. A virtual reality device comprising the object distance adjusting apparatus according to claim 1.

10. The virtual reality device according to claim 9, further comprising a display screen holder and a nut fixed to the display screen holder, wherein the display screen holder is configured to fix a display screen, and the nut is screwed to the third adjustment mechanism.

11. The object distance adjusting apparatus according to claim 1, wherein the first adjustment mechanism includes a first rotating shaft and first crown gears at both ends of the first rotating shaft,
wherein the second adjustment mechanism comprises a second rotating shaft and a second spur gear on the second rotating shaft, the second spur gear being coaxially disposed on the second rotating shaft,
wherein the first crown gear is meshed with the second spur gear.

12. The object distance adjusting apparatus according to claim 1, wherein the first adjustment mechanism includes a first rotating shaft and first crown gears at both ends of the first rotating shaft,
wherein the second adjustment mechanism comprises a second rotating shaft and a second spur gear on the second rotating shaft, the second spur gear being coaxially disposed on the second rotating shaft,
wherein the third adjustment mechanism comprises a third crown gear and a screw rod, one end of the screw rod being fixedly connected to a planar side of the third crown gear,
wherein the first crown gear is meshed with the second spur gear, and the second spur gear is meshed with the third crown gear.

13. The object distance adjusting apparatus according to claim 1, wherein the first adjustment mechanism includes a first rotating shaft and first crown gears at both ends of the first rotating shaft,
wherein the second adjustment mechanism comprises a second rotating shaft, a second spur gear on the second rotating shaft and a third spur gear on the second rotating shaft, the second spur gear and the third spur gear being coaxially disposed on the second rotating shaft,
wherein the third adjustment mechanism comprises a third crown gear and a screw rod, one end of the screw rod being fixedly connected to a planar side of the third crown gear, and the object distance adjusting apparatus comprises a plurality of said third adjustment mechanisms,
wherein the first crown gear is meshed with the second spur gear, the second spur gear is meshed with a third crown gear of one third adjustment mechanism, and the third spur gear is meshed with a third crown gear of another third adjustment mechanism.

14. The object distance adjusting apparatus according to claim 11, wherein the first adjustment mechanism further comprises a first spur gear and a second crown gear, the first spur gear being coaxially disposed on the first rotating shaft, the second crown gear being meshed with the first spur gear, and rotation of the second crown gear drives the first spur gear to rotate, thereby driving the first rotating shaft and the first crown gear to rotate.

15. The object distance adjusting apparatus according to claim 11, wherein the first adjustment mechanism further comprises a knob, one side surface of the knob being fixedly connected to a planar side of the second crown gear, and the knob is configured to drive the second crown gear to rotate.

16. The object distance adjusting apparatus according to claim 12, wherein the first adjustment mechanism further comprises a first spur gear and a second crown gear, the first spur gear being coaxially disposed on the first rotating shaft, the second crown gear being meshed with the first spur gear, and rotation of the second crown gear drives the first spur gear to rotate, thereby driving the first rotating shaft and the first crown gear to rotate.

17. The object distance adjusting apparatus according to claim 12, wherein the first adjustment mechanism further comprises a knob, one side surface of the knob being fixedly connected to a planar side of the second crown gear, and the knob is configured to drive the second crown gear to rotate.

18. The object distance adjusting apparatus according to claim 13, wherein the first adjustment mechanism further comprises a first spur gear and a second crown gear, the first spur gear being coaxially disposed on the first rotating shaft, the second crown gear being meshed with the first spur gear, and rotation of the second crown gear drives the first spur gear to rotate, thereby driving the first rotating shaft and the first crown gear to rotate.

19. The object distance adjusting apparatus according to claim 13, wherein the first adjustment mechanism further comprises a knob, one side surface of the knob being fixedly connected to a planar side of the second crown gear, and the knob is configured to drive the second crown gear to rotate.

\* \* \* \* \*